United States Patent [19]

Vos

[11] Patent Number: 4,576,390

[45] Date of Patent: Mar. 18, 1986

[54] COMBINATION OUTRIGGER STABILIZER AND LIFT AXLE FOR VEHICLES

[76] Inventor: Henry J. Vos, 313 Baldwin, Jenison, Mich. 49428

[21] Appl. No.: 531,675

[22] Filed: Sep. 13, 1983

[51] Int. Cl.[4] .............................................. B60G 17/00
[52] U.S. Cl. ................................ 280/43.23; 180/209; 280/704; 280/766.1; 298/17 SG
[58] Field of Search ............ 212/189; 298/17 B, 17 S, 298/17 SG; 180/24.02, 209; 280/763.1, 766.1, 767, 43.23, 674, 704, 754, 764

[56] References Cited

U.S. PATENT DOCUMENTS 3,502,165  3/1970  Matsukata ..................... 180/24.02
4,300,787  11/1981  Vandenberg .................... 280/704

FOREIGN PATENT DOCUMENTS 1465606  11/1965  France ......................... 280/764

Primary Examiner—David M. Mitchell
Assistant Examiner—Eric Culbreth
Attorney, Agent, or Firm—Price, Heneveld, Huizenga & Cooper

[57] ABSTRACT

A combination outrigger stabilizer and lift axle is provided for vehicles such as dump trucks, fire engines, and other similar equipment. The axle is longitudinally extensible, with a ground engaging wheel rotatably mounted on the outer end thereof. A retractable suspension resiliently supports the axle on the main frame of the vehicle, and is vertically movable between a raised, storage position, and lowered, ground engaging position. The axle can be extended longitudinally into an outrigger position, wherein the lift wheel contacts the ground at a location spaced laterally outwardly of the other, conventional wheels of the vehicle, to provide lateral or side-to-side stabilization. While the axle is in the extended, outrigger position, the resilient suspension is deactivated, and the axle is detachably connected directly with the main frame of the vehicle. This provides extra stability, and permits the vehicle to move a limited amount, such as for emptying the dump box, et cetera, even when the lift wheel is fully extended. The axle is converted into a load bearing support by longitudinally retracting the wheel, reactivating the suspension, and lowering the lift axle and wheel into the ground engaging position to assist vehicle transport.

21 Claims, 5 Drawing Figures

COMBINATION OUTRIGGER STABILIZER AND LIFT AXLE FOR VEHICLES

BACKGROUND OF THE INVENTION

The present invention relates to vehicles, and in particular to a combination outrigger stabilizer and lift axle for dump trucks, fire engines, and other similar equipment.

Outrigger stabilizers are well known for use in conjunction with various types of equipments, such as fire engines, truck loaders, and the like to provide lateral support for the vehicle when it is in a stationary, operational position. Such stabilizers typically comprise extensible arms having plate-shaped feet or spikes on the bottom, which are extended laterally outwardly to engage the ground. Although such devices do provide lateral stabilization of the equipment, the equipment cannot be moved when the outrigger stabilizers are extended. Hence, in the case of a fire truck, if the ladder portion of the truck can no longer reach the target area, the ladder must be fully retracted, and the stabilizer fully withdrawn before the truck can be repositioned. Furthermore, after the truck is repositioned, the stabilizers must be resecured, and the ladder redeployed. In a similar fashion, such stabilizers are not particularly beneficial for use in conjunction with dump trucks, since such vehicles must typically be moved forwardly a short distance while the dump box is fully raised in order to completely empty the contents of the box.

Lift axles for vehicles are also well known in the trade, and comprise ground engaging wheels which may be lifted up off of the level of the ground when they are not required.

Heretofore, vehicles have not been equipped with a combination outrigger stabilizer and lift axle, which not only provides lateral stabilization for the vehicle when required, but also can be used as a load supporting unit to assist vehicle transport.

SUMMARY OF THE INVENTION

One aspect of the present invention is a combination outrigger stabilizer and lift axle for dump trucks, fire engines, and other similar vehicles. The axle is longitudinally extensible, with a ground engaging wheel rotatably mounted on the free end thereof. A retractable suspension supports the axle on the main frame of the vehicle, and is vertically movable between a raised storage position, and lowered, ground engaging position. The axle can be extended longitudinally into an outrigger position, wherein the lift wheel contacts the ground at a location spaced laterally outwardly of the other conventional wheels of the vehicle to provide lateral stabilization. While the axle is in the extended, outrigger position, the resilient suspension is deactivated, and the axle is detachably connected directly with the main frame of the vehicle. This provides additional stability, and permits the vehicle to move a limited amount, such as for emptying the dump box, et cetera, even when the outrigger wheel is fully extended for lateral support. The axle is converted into a load bearing support by retracting the lift wheel longitudinally, reactivating the suspension, and lowering the lift axle and associated wheel into the ground engaging position.

Another aspect of the present invention is constructing the axle from two, generally straight telescoping legs, which are oriented at an acute angle to the ground, whereby lineal extension and retraction of the telescoping legs simultaneously moves the lift wheels vertically up and down, and laterally in and out.

In yet another aspect of the present invention, the retractable suspension includes a parallelogram linkage having one end pivotally connected with the lift axle, and the other end pivotally connected with the vehicle main frame to provide substantially pure vertical translation of the lift axle.

In yet another aspect of the present invention, the retractable suspension further includes support air bags connected between the lift axle and the vehicle main frame. A lift air bag, in combination with an associated lever arm, is attached to the lift axle, such that inflation and deflation of the lift air bag raises and lowers the lift axle vertically. Preferably, when the lift axle is positioned downwardly for transport, both the support air bags and the lift bags are inflated, so that they act as a damper for the suspension.

The principal objects of the present invention are to provide an axle arrangement which acts both as an outrigger stabilizer, and a retractable, weight supporting axle. The axle includes a resilient suspension to facilitate supporting the vehicle during transport. When the axle is extended outwardly into the outrigger position, the suspension is deactivated, and the axle is connected directly with the main frame of the vehicle to provide additional side-to-side stability, so that the vehicle can be moved a limited amount even when the outrigger wheel is extended. By combining the outrigger and lift axle functions, very little deadweight is added to the vehicle. The axle has an uncomplicated construction which is relatively lightweight, economical to manufacture, efficient in use, capable of a long operating life, and particularly well adapted for the proposed use.

These and other features, advantages and objects of the present invention will be further understood and appreciated by those skilled in the art by reference to the following written specification, claims and appended drawings.

DETAILED DESCRIPTION OF THE PREFERRED EMBODIMENTS

For purposes of description herein, the terms "upper," "lower," "right," "left," "rear," "front," "vertical," "horizontal," and derivitives thereof shall relate to the invention with respect to a seated driver or operator of the vehicle. However, it is to be understood that the invention may assume various alternative orientations, except where expressly specified to the contrary.

Figure 1:
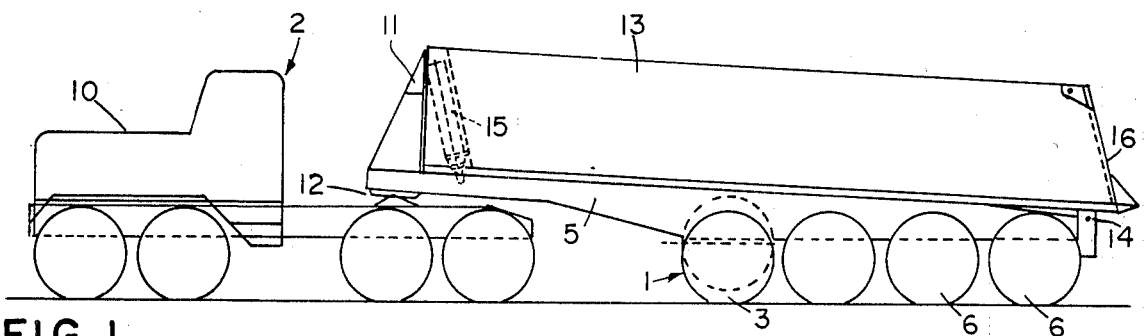
FIG. 1 is a partially schematic, side elevational view of a vehicle having a combination outrigger stabilizer and lift axle embodying the present invention.

The reference numeral 1 (FIG. 1) generally designates a combination outrigger stabilizer and lift axle embodying the present invention. Axle 1 is particularly designed for multi-wheeled vehicles, such as fire engines, and the illustrated dump truck 2. Axle 1 is longitudinally extensible, and includes a ground engaging wheel 3 rotatably mounted on the free end thereof. A retractable suspension 4 supports axle 1 from the main frame 5 of vehicle 2, and is vertically movable between a raised, storage position (FIG. 4), and a lowered, ground engaging position (FIG. 5). Axle 1 can be extended longitudinally as shown by the broken lines in FIG. 4 into an outrigger position, wherein lift wheel 3 contacts the ground at a location spaced laterally outwardly of the other, conventional wheels 6 of vehicle 2 to provide lateral stabilization. While axle 1 is in the extended, outrigger position, the resilient suspension 4 is deactivated, and axle 1 is detachably connected directly with the main frame 5 of vehicle 2. This provides additional stability, and permits the vehicle 2 to move a limited amount, such as for emptying the dump box, et cetera, even when lift wheel 3 is still fully extended. Axle 1 is converted into a load bearing support by longitudinally retracting lift wheel 3 to the position shown by the full lines in FIG. 4, reactivating suspension 4, and lowering the lift axle 1 and wheel 3 into the ground engaging position shown in FIG. 5 to assist vehicle transport.

Except as described hereinbelow, vehicle 2 comprises a generally conventional dump truck, having a tractor 10 with a trailer 11 attached thereto by a fifth wheel 12. Trailer 11 includes a dump box 13, which is pivotally mounted at a rear portion thereof by a hinge pin 14, and is rotated by the extension and retraction of a hoist cylinder 15. A gate 16 is pivotally mounted on the rear portion of dump box 13, and selectively closes and opens the rearward end thereof.

Figure 2:
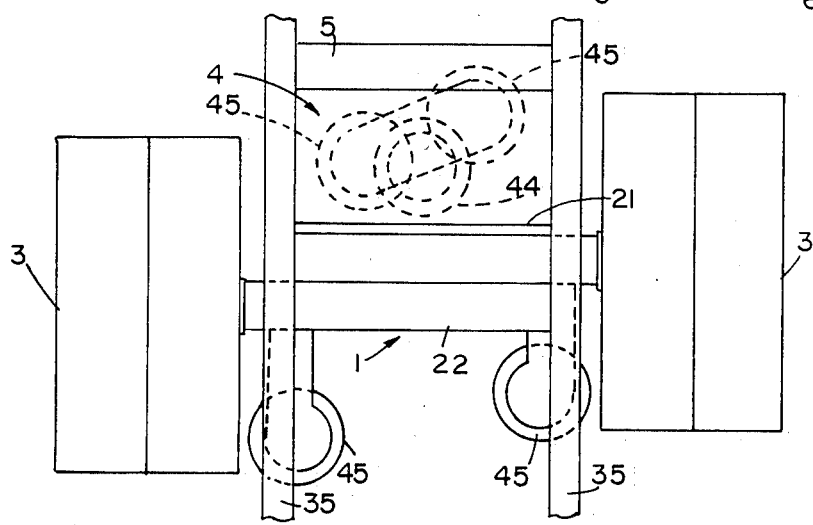
FIG. 2 is a partially schematic, fragmentary, top plan view of the axle.

Vehicle 2 preferably includes a combination outrigger and lift axle 1 on each side thereof, as illustrated in FIG. 2. Since the full width of the vehicle frame 5 is required for each axle 1, they are positioned in a longitudinally staggered orientation, as illustrated in FIG. 2. Because each axle 1 is otherwise identical, the present description shall relate only to a single axle assembly.

Figure 4:
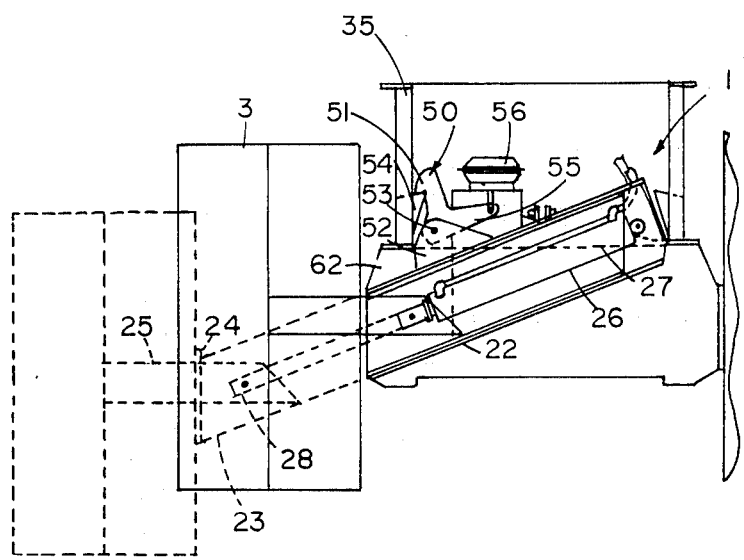
FIG. 4 is a partially schematic, fragmentary, end elevational view of the axle, shown in a raised position.
Figure 5:
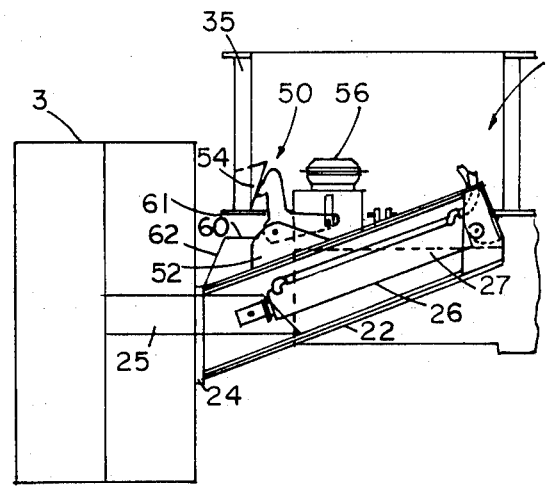
FIG. 5 is a partially schematic, fragmentary, end elevational view of the axle, shown in a lowered position.

With reference to FIGS. 4 and 5, axle 1 includes two, generally straight, telescoping legs 22 and 23. The outermost leg 23 is slightly smaller, and telescopes into the inner leg 22. Outer leg 23 includes a rigidly mounted end plate 24 through which a horizontally oriented axle 25 is fixedly attached. Axle 25 rotatably mounts lift wheel 3 thereon. In this example, axle legs 21 and 22 are constructed of hollow, rectangularly-shaped channel. A hydraulic cylinder, or other similar linear motor is positioned within legs 22 and 23, and is connected therewith to extend and retract the same. Hydraulic cylinder 26 has its upper end 27 pivotally attached to an upper portion of the inner axle leg 22. The lower end 28 of cylinder 26 is pivotally attached to an outwardly portion of leg 23. The lift axle 1 is oriented at an acute angle to the ground level, such that lineal extension and retraction of hydraulic cylinder 26 and associated telescoping legs 22 and 23 simultaneously moves lift wheel 3 vertically upwardly and downwardly, and laterally inwardly and outwardly.

Figure 3:
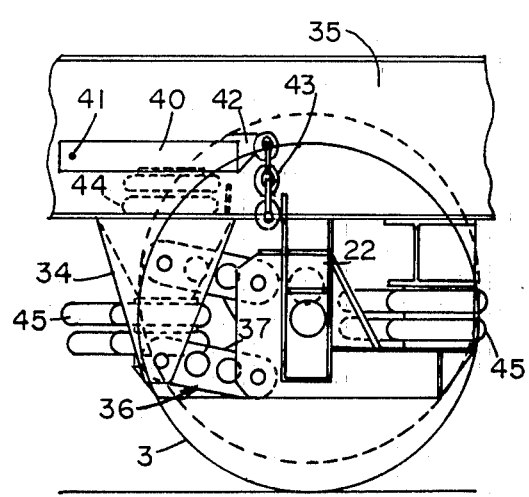
FIG. 3 is a partially schematic, fragmentary, side elevational view of the axle.

With reference to FIGS. 2 and 3, suspension 4 attaches axle 1 to the main frame portion 5 of vehicle 2 in the following manner. A pair of generally triangularly shaped gussets or brackets 34 are attached to and depend from the siderails 35 of the vehicle main frame 5. A parallelogram linkage arrangement 36 is provided, with the forward ends of the links 37 pivotally attached to bracket 34, and the opposite ends pivotally attached to the inner axle leg 22. In this fashion, axle 1 is raised and lowered with substantially pure vertical translation. A lever arm 40 has its forward end 41 pivotally attached to the main frame side rail 35, and its forward end 42 pivotally connected with the inner axle leg 22, which in this example is attached by a chain 43. A lift air cylinder 44 has its base mounted on the flange portion of side rail 35, and its top attached to a medial area of support lever 40. Hence, inflation and deflation of lift air bag 44 raises and lowers axle 1 between the storage and ground engaging positions. A pair of support air bags 45 are mounted between the main frame 5 of vehicle 2 and axle leg 22, and are inflated to support the weight of the vehicle. When axle 1 is to be raised into the storage position, the air in support bags 45 is exhausted, and lift air bag 44 is inflated, so that chain 43 lifts axle 1 vertically upwardly. To lower the axle 1 into the ground engaging position, support air bags 45 are reinflated, thereby pulling the axle 1 downwardly, so that lift wheel 3 engages the ground. Preferably, lift air bag 44 remains inflated during the transport position, so that it acts as a dampener or shock absorber.

With reference to FIGS. 4 and 5, a latch mechanism 50 is provided to temporarily deactivate the resilient suspension 4, and connect axle 1 directly or rigidly with the main frame 5 of vehicle 2. When axle 1 is locked to the main frame 5, the outrigger wheels 3 provide a very wide base that stabilizes the vehicle laterally or side-to-side. If the axle 1 were not locked to the main frame 5 in the outrigger position, the stabilizing forces achieved by the outrigger wheels would have to be transmitted through the resilient suspension 4. In this manner, the dump box 13 would be allowed to tilt about the suspension, even though the outrigger wheels were in place. This would effectively eliminate any potential stabilizing benefit achieved by the outrigger wheel. Hence, it is very important that the axle 1 be locked rigidly to the main frame 5 of the vehicle 2 when the outrigger wheel 3 is extended.

In this example, latch 50 is a hook-shaped arm 51, pivotally attached at its base to a bracket 52 on inner axle leg 22 by pin 53. The hook-shaped arm 51 of latch 50 matingly engages a similarly shaped wedge 54, which is attached rigidly to the side rail 35 of vehicle main frame 5. Latch 50 also includes a second, laterally extending arm 55, having an air cylinder 56 connected with the outer end thereof. Air cylinder 56 is spring loaded into a normally retracted position. When air cylinder 56 is extended, latch 50 is pivoted in a clockwise direction, as viewed in FIG. 4, thereby disengaging the hook-shaped arm 51 from mating wedge 54, and permitting axle 1 to be lowered into the ground engaging position. As axle 1 is raised into the storage position, the arcuately shaped portion of hook arm 51 engages the inclined surface of wedge 54 until the hook snaps over into the normally locked position. The upper surface 60 of axle leg 22 abuts a mating surface 61 of axle weldment 62 to rigidly interconnect axle 1 with main frame 5.

In operation, vehicle 2 is operated in the following fashion. As vehicle 2 exits the highway into the dump site, both lift wheels 3 are raised to provide additional maneuverability. The air in support air bags 45 are exhausted, and lift air bags 44 are inflated, thereby raising lift axles 1 vertically upwardly into the storage position. As the lift axles reach the fully raised position, latchs 50 engage mating wedges 54 to positively lock the axles to the main frame 5 of vehicle 2. After the vehicle reaches the location at which the material is to be dumped, the hydraulic cylinders 26 on each of the axles 1 are extended, thereby translating the lift wheels 3 downwardly and outwardly into engagement with the ground, at a location spaced laterally outwardly of the other, conventional wheels on the vehicle. The hoist cylinder 15 is then extended, thereby raising dump box 13 upwardly, such that the material in the dump box 13 flows out of the rear gate 16 under gravitational forces. Normally, the material in the dump box will accumulate at the gate 16, so that to completely empty the dump box 13, it is necessary to move the vehicle forwardly several yards. With the present invention, the truck operator simply pulls the vehicle forwardly with the axles 1 fully extended in the outrigger position. There is on need to retract the stabilizers, and/or lower the dump box before the vehicle can be safely moved.

After the dump box 13 has been emptied and fully lowered, hydraulic cylinders 26 are retracted, thereby translating lift wheels 3 back into the storage position.

Once another load has been placed into the vehicle dump box 13, the operator may wish to again lower the lift wheels 3 to provide additional support. This is achieved by extending air cylinders 56, which release latchs 50. Support air bags 45 are then inflated, thereby pushing the axles 1 and associate lift wheels 3 into the ground engaging position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a vehicle including a main frame portion and wheels, the improvement of a combination outrigger stabilizer and lift axle, comprising:
   an extensible lift axle, having a ground engaging lift wheel rotatably mounted on an outer end thereof;
   a retractable suspension arrangement, resiliently supporting said lift axle on a main frame portion of said vehicle;
   means for bodily translating said lift axle in a vertical direction, between a raised, storage position wherein said lift wheel is lifted above the ground and is laterally aligned with other conventional wheels of said vehicle, and a lowered, weight supporting position wherein said lift wheel engages the ground in lateral alignment with said other conventional wheels, and supports the weight of the vehicle through said suspension arrangement;
   means for longitudinally shifting said lift axle between an extended, outrigger position wherein said lift wheel contacts the ground at a location spaced laterally outwardly from said other conventional wheels of the vehicle to provide lateral stabilization to the vehicle, and a retracted, storage position wherein said lift wheel is raised above the ground and is drawn into lateral alignment with the other conventional wheels of the vehicle;
   means for selectively deactivating said suspension arrangement and detachably connecting said lift axle directly with the main frame of said vehicle when said lift axle is in the raised, storage position, whereby said lift wheel provides lateral support directly to the main frame of said vehicle when said lift axle is in the extended, outrigger position, as well as resilient weight support when said suspension arrangement is reactivated, and said lift axle is moved into the lowered, retracted position to assist vehicle transport.

2. A vehicle as set forth in claim 1, wherein:
said lift wheel is rotatable in the extended, outrigger position to permit movement of said vehicle while being laterally stabilized.

3. A vehicle as set forth in claim 2, wherein:
said lift axle comprises two, generally straight, telescoping legs, which are oriented at an acute angle to the ground, whereby lineal extension and retraction of said telescoping legs simultaneously moves said lift wheel vertically up and down, and laterally in and out.

4. A vehicle as set forth in claim 3, wherein:
said suspension arrangement includes a parallelogram linkage, having one side pivotally connected with said lift axle, and opposite side pivotally connected with said vehicle main frame to provide substantially pure vertical translation of said lift axle.

5. A vehicle as set forth in claim 4, wherein said suspension arrangement further includes support air bags connected between said lift axle and said vehicle main frame through which the weight of said vehicle is transmitted to the ground.

6. A vehicle as set forth in claim 5, wherein said vertical translating means for said lift axle comprises:
   a lever arm having one end pivotally connected with said vehicle main frame, and the other end connected with said lift axle;
   a lift air bag mounted on said vehicle main frame, and connected with said lever arm at a location thereon spaced longitudinally apart from said one end, whereby inflation and deflation of said lift air bag raises and lowers said lift axle vertically.

7. A vehicle as set forth in claim 6, wherein said suspension arrangement deactivating means comprises:
   means for selectively exhausting air from said support air bags, and inflating said lift air bag to lift said lift axle to the raised, storage position; and
   a mechanical latch selectively and rigidly interconnecting said lift axle and said vehicle main frame.

8. A vehicle as set forth in claim 7, including:
a remotely activated air cylinder connected with and shifting said mechanical latch between latched and unlatched positions.

9. A vehicle as set forth in claim 8, including:
means for maintaining said lift air bag in an inflated condition when the lift wheel is in the lowered, weight supporting position during transport to act as a damper for said suspension arrangement.

10. A vehicle as set forth in claim 9, wherein:
said telescoping legs are constructed out of hollow channel; and
said longitudinal shifting means for said lift axle comprises a hydraulic cylinder positioned within said telescoping legs, having opposite ends thereof connected with an associated one of said legs.

11. A vehicle as set forth in claim 10, wherein:
said vehicle has two combination outrigger stabilizer and lift axles, which are mounted on opposite sides of said vehicle.

12. A vehicle as set forth in claim 11, wherein:
said two combination axles are arranged in a longitudinally staggered relationship.

13. A vehicle as set forth in claim 1, wherein:
said lift axle comprises two, generally straight, telescoping legs, which are oriented at an acute angle to the ground, whereby lineal extension and retraction of said telescoping legs simultaneously moves said lift wheel vertically up and down, and laterally in and out.

14. A vehicle as set forth in claim 1, wherein:
said suspension arrangement includes a parallelogram linkage, having one side pivotally connected with said lift axle, and an opposite side pivotally connected with said vehicle main frame to provide substantially pure vertical translation of said lift axle.

15. A vehicle as set forth in claim 1, wherein
said suspension arrangement includes support air bags connected between said lift axle and said vehicle main frame through which the weight of said vehicle is transmitted to the ground.

16. A vehicle as set forth in claim 1, wherein said vertical translating means for said lift axle comprises:
a lever arm having one end pivotally connected with said vehicle main frame, and the other end connected with said lift axle;
a lift air bag mounted on said vehicle main frame, and connected with said lever arm at a location thereon spaced longitudinally apart from said one end, whereby inflation and deflation of said lift air bag raises and lowers said lift axle vertically.

17. A vehicle as set forth in claim 1, wherein:
said vehicle has two combination outrigger stabilizer and lift axles, which are mounted on opposite sides of said vehicle.

18. A vehicle as set forth in claim 1, wherein:
each lift wheel is rotatable in the extended, outrigger position to permit movement of said vehicle while being laterally stabilized.

19. A combination outrigger stabilizer and lift axle for vehicles, comprising:
an extensible axle adapted, having a ground engaging lift wheel rotatably mounted on an outer end thereof;
a retractable suspension arrangement, adapted to resiliently support said extensible axle on a main frame portion of the vehicle;
means for bodily translating said extensible axle in a vertical direction, between a raised, storage position wherein said lift wheel is lifted above the ground and is laterally aligned with other conventional wheels of the vehicle, and a lowered, weight supporting position wherein said lift wheel engages the ground and supports the weight of the vehicle through said suspension arrangement;
means for longitudinally shifting said extensible axle between an extended, outrigger position wherein said lift wheel contacts the ground at a location spaced laterally outwardly from the other conventional wheels of the vehicle to provide lateral stabilization to the vehicle, and a retracted, storage position wherein said lift wheel is raised above the ground and is laterally aligned with the other, conventional wheels of the vehicle;
means for selectively deactivating said suspension arrangement and adapted to detachably connect said extensible axle directly with the main frame of the vehicle when said axle is in the raised storage position, whereby said lift wheel is adapted to provide lateral support directly to the main frame of the vehicle when the axle is in the extended outrigger position, as well as resilient weight support when the axle is in the lowered position to assist vehicle transport.

20. A combination outrigger and lift axle as set forth in claim 19, wherein:
said lift wheel is rotatable in the extended, outrigger position to permit movement of said vehicle while being laterally stabilized.

21. In a vehicle including a main frame portion and wheels, the improvement of a combination outrigger stabilizer and lift axle, comprising:
an extensible lift axle, having a ground engaging lift wheel rotatably mounted on an outer end thereof;
a retractable suspension arrangement, resiliently supporting said lift axle on a main frame portion of said vehicle;
means for bodily translating said lift axle in a vertical direction, between a raised, storage position wherein said lift wheel is lifted above the ground and is laterally aligned with other conventional wheels of said vehicle, and a lowered, weight supporting position wherein said lift wheel engages the ground in lateral alignment with said other conventional wheels, and supports the weight of the vehicle through said suspension arrangement;
means for longitudinally shifting said lift axle between an extended, outrigger position wherein said lift wheel contacts the ground at a location spaced laterally outwardly from said other conventional wheels of the vehicle to provide lateral stabilization to the vehicle, and a retracted, storage position wherein said lift wheel is raised above the ground and is drawn into lateral alignment with the other conventional wheels of the vehicle;
means for selectively deactivating said suspension arrangement and detachably connecting said lift axle directly with the main frame of said vehicle when said lift axle is in the raised, storage position, whereby said lift wheel provides lateral support directly to the main frame of said vehicle when said lift axle is in the extended, outrigger position, as well as resilient weight support when said suspension arrangement is reactivated, and said lift axle is moved into the lowered, retracted position to assist vehicle transport; and wherein
said suspension arrangement includes a parallelogram linkage, having one side pivotally connected with said lift axle, and an opposite side pivotally connected with said vehicle main frame to provide substantially pure vertical translation of said lift axle.

* * * * *